(12) United States Patent
Moore

(10) Patent No.: US 10,360,945 B2
(45) Date of Patent: *Jul. 23, 2019

(54) USER INTERFACE FOR EDITING DIGITAL MEDIA OBJECTS

(71) Applicant: GoPro, Inc., San Mateo, CA (US)

(72) Inventor: Stephen Trey Moore, San Antonio, TX (US)

(73) Assignee: GoPro, Inc., San Mateo, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 15/377,564

(22) Filed: Dec. 13, 2016

(65) Prior Publication Data

US 2017/0092327 A1 Mar. 30, 2017

Related U.S. Application Data

(63) Continuation of application No. 14/234,653, filed as application No. PCT/US2012/050155 on Aug. 9, 2012, now Pat. No. 9,557,885.

(Continued)

(51) Int. Cl.
*G11B 27/34* (2006.01)
*G06F 3/0481* (2013.01)
(Continued)

(52) U.S. Cl.
CPC .......... *G11B 27/036* (2013.01); *G06F 3/0482* (2013.01); *G06F 3/04817* (2013.01);
(Continued)

(58) Field of Classification Search
CPC ... G11B 27/036; G11B 27/031; G11B 27/034; G06F 17/30056; G06F 3/04817; G06F 3/0482
See application file for complete search history.

(56) References Cited

U.S. PATENT DOCUMENTS

| 5,130,794 A | 7/1992 | Ritchey |
| 6,337,683 B1 | 1/2002 | Gilbert |

(Continued)

FOREIGN PATENT DOCUMENTS

| WO | 2001020466 | 3/2001 |
| WO | 2009040538 A1 | 4/2009 |
| WO | WO2010071996 A1 | 7/2010 |

OTHER PUBLICATIONS

Transmittal of the International Search Report and the Written Opinion of the International Searching Authority for PCT/US2012/050155 dated Oct. 22, 2012, 7 pages.

(Continued)

*Primary Examiner* — Nicholas Ulrich
(74) *Attorney, Agent, or Firm* — Esplin & Associates, PC

(57) ABSTRACT

A computer-implemented method involving an object-based editing environment for defining a digital video as a linear arrangement of discrete media objects, each digital media object electronically stored as a digital file. The method includes displaying a graphical representation of a first digital media object within the editing environment; displaying one or more user interface icons associated with the digital media object; displaying a first menu in response to receiving a first user input; receiving second user input associated with the first menu and identifying a second digital media object; displaying a graphical representation of the second digital media object within the editing environment; and generating a digital video comprising the first digital media object and the second digital media object.

20 Claims, 8 Drawing Sheets

Related U.S. Application Data

(60) Provisional application No. 61/521,624, filed on Aug. 9, 2011.

(51) Int. Cl.
  *G06F 3/0482* (2013.01)
  *G11B 27/031* (2006.01)
  *G11B 27/036* (2006.01)
  *G11B 27/034* (2006.01)

(52) U.S. Cl.
  CPC .......... *G11B 27/031* (2013.01); *G11B 27/034* (2013.01); *G11B 27/34* (2013.01)

(56) References Cited

U.S. PATENT DOCUMENTS

| | | |
|---|---|---|
| 6,593,956 B1 | 7/2003 | Potts |
| 7,222,356 B1 | 5/2007 | Yonezawa |
| 7,325,199 B1 | 1/2008 | Reid |
| 7,352,952 B2 | 4/2008 | Herberger et al. |
| 7,483,618 B1 | 1/2009 | Edwards |
| 7,890,867 B1 | 2/2011 | Margulis |
| 8,446,433 B1 | 5/2013 | Mallet |
| 8,611,422 B1 | 12/2013 | Yagnik |
| 8,718,447 B2 | 5/2014 | Yang |
| 8,730,299 B1 | 5/2014 | Kozko |
| 8,763,023 B1 | 6/2014 | Goetz |
| 8,910,046 B2 | 12/2014 | Matsuda |
| 8,988,509 B1 | 3/2015 | Macmillan |
| 9,032,299 B2 | 5/2015 | Lyons |
| 9,036,001 B2 | 5/2015 | Chuang |
| 9,077,956 B1 | 7/2015 | Morgan |
| 9,111,579 B2 | 8/2015 | Meaney |
| 9,142,253 B2 | 9/2015 | Ubillos |
| 9,151,933 B2 | 10/2015 | Sato |
| 9,204,039 B2 | 12/2015 | He |
| 9,208,821 B2 | 12/2015 | Evans |
| 9,245,582 B2 | 1/2016 | Shore |
| 9,253,533 B1 | 2/2016 | Morgan |
| 9,317,172 B2 | 4/2016 | Lyons |
| 9,423,944 B2 | 8/2016 | Eppolito |
| 9,473,758 B1 | 10/2016 | Long |
| 9,479,697 B2 | 10/2016 | Aguilar |
| 9,557,885 B2 | 1/2017 | Moore |
| 9,564,173 B2 | 2/2017 | Swenson |
| 2004/0128317 A1 | 7/2004 | Sull |
| 2004/0216173 A1 | 10/2004 | Horoszowski |
| 2005/0025454 A1 | 2/2005 | Nakamura |
| 2005/0084232 A1* | 4/2005 | Herberger ............ G11B 27/031 386/282 |
| 2006/0122842 A1 | 6/2006 | Herberger |
| 2006/0265657 A1 | 11/2006 | Gilley |
| 2007/0074115 A1* | 3/2007 | Patten .................. G11B 27/032 715/716 |
| 2007/0173296 A1 | 7/2007 | Hara |
| 2007/0204310 A1 | 8/2007 | Hua |
| 2007/0230461 A1 | 10/2007 | Singh |
| 2008/0036917 A1 | 2/2008 | Pascarella et al. |
| 2008/0044155 A1 | 2/2008 | Kuspa |
| 2008/0120550 A1 | 5/2008 | Oakley et al. |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0208791 A1 | 8/2008 | Das |
| 2008/0244410 A1 | 10/2008 | Schormann |
| 2008/0253735 A1 | 10/2008 | Kuspa |
| 2008/0313541 A1 | 12/2008 | Shafton |
| 2009/0037818 A1 | 2/2009 | Lection |
| 2009/0088143 A1 | 4/2009 | Kim et al. |
| 2009/0089651 A1 | 4/2009 | Herberger et al. |
| 2009/0213270 A1 | 8/2009 | Ismert |
| 2009/0274339 A9 | 11/2009 | Cohen |
| 2009/0327856 A1 | 12/2009 | Mouilleseaux |
| 2010/0045773 A1 | 2/2010 | Ritchey |
| 2010/0064219 A1 | 3/2010 | Gabrisko |
| 2010/0086216 A1 | 4/2010 | Lee |
| 2010/0104261 A1 | 4/2010 | Liu |
| 2010/0174993 A1 | 7/2010 | Pennington et al. |
| 2010/0183280 A1 | 7/2010 | Beauregard |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0275123 A1 | 10/2010 | Yu et al. |
| 2010/0278504 A1 | 11/2010 | Lyons |
| 2010/0278509 A1 | 11/2010 | Nagano |
| 2010/0281375 A1 | 11/2010 | Pendergast |
| 2010/0281376 A1 | 11/2010 | Meaney et al. |
| 2010/0281385 A1 | 11/2010 | Meaney et al. |
| 2010/0281386 A1 | 11/2010 | Lyons |
| 2010/0287476 A1 | 11/2010 | Sakai |
| 2010/0299630 A1 | 11/2010 | McCutchen |
| 2010/0318660 A1 | 12/2010 | Balsubramanian |
| 2010/0321471 A1 | 12/2010 | Casolara |
| 2011/0025847 A1 | 2/2011 | Park |
| 2011/0069148 A1 | 3/2011 | Jones |
| 2011/0069189 A1 | 3/2011 | Venkataraman |
| 2011/0075990 A1 | 3/2011 | Eyer |
| 2011/0093798 A1 | 4/2011 | Shahraray |
| 2011/0134240 A1 | 6/2011 | Anderson |
| 2011/0173565 A1 | 7/2011 | Ofek |
| 2011/0206351 A1 | 8/2011 | Givoly |
| 2011/0211040 A1 | 9/2011 | Lindemann |
| 2011/0258049 A1 | 10/2011 | Ramer |
| 2011/0258547 A1 | 10/2011 | Symons et al. |
| 2011/0276881 A1 | 11/2011 | Keng et al. |
| 2011/0293250 A1 | 12/2011 | Deever |
| 2011/0320322 A1 | 12/2011 | Roslak |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0127169 A1 | 5/2012 | Barcay |
| 2012/0206565 A1 | 8/2012 | Villmer |
| 2012/0311448 A1 | 12/2012 | Achour |
| 2013/0024805 A1 | 1/2013 | In |
| 2013/0044108 A1 | 2/2013 | Tanaka |
| 2013/0058532 A1 | 3/2013 | White |
| 2013/0063561 A1 | 3/2013 | Stephan |
| 2013/0078990 A1 | 3/2013 | Kim |
| 2013/0127636 A1 | 5/2013 | Aryanpur |
| 2013/0136193 A1 | 5/2013 | Hwang |
| 2013/0142384 A1 | 6/2013 | Ofek |
| 2013/0145269 A1 | 6/2013 | Latulipe |
| 2013/0151970 A1 | 6/2013 | Achour |
| 2013/0166303 A1 | 6/2013 | Chang |
| 2013/0191743 A1 | 7/2013 | Reid |
| 2013/0195429 A1 | 8/2013 | Fay |
| 2013/0197967 A1 | 8/2013 | Pinto |
| 2013/0208134 A1 | 8/2013 | Hamalainen |
| 2013/0208942 A1 | 8/2013 | Davis |
| 2013/0215220 A1 | 8/2013 | Wang |
| 2013/0227415 A1 | 8/2013 | Gregg |
| 2013/0259399 A1 | 10/2013 | Ho |
| 2013/0263002 A1 | 10/2013 | Park |
| 2013/0283301 A1 | 10/2013 | Avedissian |
| 2013/0287214 A1 | 10/2013 | Resch |
| 2013/0287304 A1 | 10/2013 | Kimura |
| 2013/0300939 A1 | 11/2013 | Chou |
| 2013/0308921 A1 | 11/2013 | Budzinski |
| 2013/0318443 A1 | 11/2013 | Bachman |
| 2013/0343727 A1 | 12/2013 | Rav-Acha |
| 2014/0023341 A1 | 1/2014 | Wang |
| 2014/0026156 A1 | 1/2014 | Deephanphongs |
| 2014/0043340 A1 | 2/2014 | Sobhy |
| 2014/0064706 A1 | 3/2014 | Lewis, II |
| 2014/0072285 A1 | 3/2014 | Shynar |
| 2014/0093164 A1 | 4/2014 | Noorkami |
| 2014/0096002 A1 | 4/2014 | Dey |

(56) References Cited

U.S. PATENT DOCUMENTS

| | | |
|---|---|---|
| 2014/0105573 A1 | 4/2014 | Hanckmann |
| 2014/0161351 A1 | 6/2014 | Yagnik |
| 2014/0165119 A1 | 6/2014 | Liu |
| 2014/0169766 A1 | 6/2014 | Yu |
| 2014/0176542 A1 | 6/2014 | Shohara |
| 2014/0179259 A1 | 6/2014 | Liu |
| 2014/0181666 A1 | 6/2014 | Moore |
| 2014/0193040 A1 | 7/2014 | Bronshtein |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0232819 A1 | 8/2014 | Armstrong |
| 2014/0245336 A1 | 8/2014 | Lewis, II |
| 2014/0300644 A1 | 10/2014 | Gillard |
| 2014/0328570 A1 | 11/2014 | Cheng |
| 2014/0341528 A1 | 11/2014 | Mahate |
| 2014/0366052 A1 | 12/2014 | Ives |
| 2014/0376876 A1 | 12/2014 | Bentley |
| 2015/0015680 A1 | 1/2015 | Wang |
| 2015/0022355 A1 | 1/2015 | Pham |
| 2015/0029089 A1 | 1/2015 | Kim |
| 2015/0058709 A1 | 2/2015 | Zaletel |
| 2015/0085111 A1 | 3/2015 | Lavery |
| 2015/0154452 A1 | 6/2015 | Bentley |
| 2015/0178915 A1 | 6/2015 | Chatterjee |
| 2015/0186073 A1 | 7/2015 | Pacurariu |
| 2015/0220504 A1 | 8/2015 | Bocanegra Alvarez |
| 2015/0254871 A1 | 9/2015 | Macmillan |
| 2015/0256746 A1 | 9/2015 | Macmillan |
| 2015/0256808 A1 | 9/2015 | Macmillan |
| 2015/0271483 A1 | 9/2015 | Sun |
| 2015/0287435 A1 | 10/2015 | Land |
| 2015/0294141 A1 | 10/2015 | Molyneux |
| 2015/0318020 A1 | 11/2015 | Pribula |
| 2015/0339324 A1 | 11/2015 | Westmoreland |
| 2015/0375117 A1 | 12/2015 | Thompson |
| 2015/0382083 A1 | 12/2015 | Chen |
| 2016/0005435 A1 | 1/2016 | Campbell |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0088287 A1 | 3/2016 | Sadi |
| 2016/0098941 A1 | 4/2016 | Kerluke |
| 2016/0119551 A1 | 4/2016 | Brown |
| 2016/0217325 A1 | 7/2016 | Bose |
| 2016/0225405 A1 | 8/2016 | Matias |
| 2016/0225410 A1 | 8/2016 | Lee |
| 2016/0234345 A1 | 8/2016 | Roberts |
| 2016/0247535 A1 | 8/2016 | Latulipe |
| 2016/0358603 A1 | 12/2016 | Azam |
| 2016/0366330 A1 | 12/2016 | Boliek |
| 2017/0006214 A1 | 1/2017 | Andreassen |
| 2017/0062016 A1 | 3/2017 | Samra |
| 2017/0242504 A1 | 8/2017 | Hanson |
| 2017/0256288 A1 | 9/2017 | Ai |

OTHER PUBLICATIONS

Transmittal of the International Preliminary Report on Patentability for PCT/US2012/050155 dated Feb. 20, 2014, 6 pages.

Ernoult, Emeric, 'How to Triple Your YouTube Video Views with Facebook', SocialMediaExaminer.com, Nov. 26, 2012, 16 pages.

FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.

FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.

FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.

Han et al., Deep Compression: Compressing Deep Neural Networks with Pruning, Trained Quantization and Huffman Coding, International Conference on Learning Representations 2016, 14 pgs.

He et al., 'Deep Residual Learning for Image Recognition,' arXiv:1512.03385, 2015, 12 pgs.

Iandola et al., 'SqueezeNet: AlexNet-level accuracy with 50× fewer parameters and <0.5MB model size', arXiv:1602.07360v3 [cs.CV] Apr. 6, 2016 (9 pgs.).

Ioffe et al., 'Batch Normalization: Accelerating Deep Network Training by Reducing Internal Covariate Shift,' arXiv:1502.03167, 2015, 11 pgs.

Parkhi et al., 'Deep Face Recognition,' Proceedings of the British Machine Vision, 2015, 12 pgs.

PCT International Preliminary Report on Patentability for PCT/US2015/023680, dated Oct. 4, 2016, 10 pages.

PCT International Search Reort for PCT/US15/18538 dated Jun. 16, 2015 (2 pages).

PCT International Search Report and Written Opinion for PCT/US15/12086 dated Mar. 17, 2016, 7 pages.

PCT International Search Report and Written Opinion for PCT/US15/18538, Jun. 16, 2015, 26 pages.

PCT International Search Report and Written Opinion for PCT/US16/31076, Aug. 8, 2016, 19 Pages.

PCT International Search Report for PCT/US15/23680 dated Aug. 3, 2015, 4 pages.

PCT International Search Report for PCT/US15/41624 dated Nov. 4, 2015, 5 pages.

PCT International Search Report for PCT/US17/16367 dated Apr. 14, 2017 (2 pages).

PCT International Written Opinion for PCT/US2015/041624, Dec. 17, 2015, 7 Pages.

Ricker, 'First Click: TomTom's Bandit camera beats GoPro with software' Mar. 9, 2016 URL: http://www.theverge.com/2016/3/9/11179298/tomtom-bandit-beats-gopro (6 pages).

Schroff et al., 'FaceNet: A Unified Embedding for Face Recognition and Clustering,' IEEE Conference on Computer Vision and Pattern Recognition (CVPR), 2016, 10 pgs.

Tran et al., 'Learning Spatiotemporal Features with 3D Convolutional Networks', arXiv:1412.0767 [cs.CV] Dec. 2, 2014 (9 pgs).

Yang et al., 'Unsupervised Extraction of Video Highlights via Robust Recurrent Auto-encoders' arXiv:1510.01442v1 [cs.CV] Oct. 6, 2015 (9 pgs).

* cited by examiner

USER INTERFACE FOR EDITING DIGITAL MEDIA OBJECTS

CLAIM OF PRIORITY

This application is a continuation of U.S. patent application Ser. No. 14/234,653, filed on Jan. 24, 2014, which is the U.S. national stage under 35 USC § 371 of International Application Number PCT/US2012/050155, filed on Aug. 9, 2012, which claims the benefit under 35 USC § 119(e) of U.S. Provisional Patent Application Ser. No. 61/521,624, filed on Aug. 9, 2011. The entire contents of each of the foregoing applications are incorporated by reference.

TECHNICAL FIELD

This specification generally relates to digital media editing particularly for mobile processing devices.

SUMMARY

In general, innovative aspects of the subject matter described in this specification can be embodied in methods that include the actions of providing an object-based editing environment for defining a digital video as a linear arrangement of discrete media objects, each digital media object electronically stored as a digital file, displaying a graphical representation of a first digital media object within the editing environment, displaying one or more user interface icons associated with the digital media object, receiving first user input, the first user input corresponding to a first interface icon of the one or more interface icons, in response to receiving the first user input, displaying a first menu, receiving second user input associated with the first menu, the second user input identifying a second digital media object, displaying a graphical representation of the second digital media object within the editing environment, and generating a digital video comprising the first digital media object and the second digital media object. Other embodiments of these aspects include corresponding systems, apparatus, and computer programs, configured to perform the actions of the methods, encoded on computer storage devices.

These and other embodiments may each optionally include one or more of the following features. For instance, the first digital media object comprises one of a first digital video, a first digital image, a first title and a first transition; the second digital media object includes one of a second digital video, a second digital image, a second title and a second transition, the first interface icon includes an insert icon indicating insertion of the second media object before or after the first digital media object; generating the digital video includes merging the first and second digital objects; the first menu comprises a plurality of option buttons, each option button corresponding to a different type of media object; the second user input includes a selection of an option button, the second media object being of a type of media object corresponding to the option button; the first menu is a contextual menu, the content of which is based on a type of the first interface icon; the first interface icon is an insertion icon; actions further include: receiving third user input, the third user input corresponding to a second interface icon of the one or more interface icons, and in response to receiving the third user input, displaying a second menu, the second menu is a contextual menu, the content of which is based on a type of the first media object; the first menu is displayed within the graphical representation of the first media object; and actions further include displaying an overview timeline, the overview timeline including thumbnail representations of each of the first and second media objects.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to mobile device applications for enabling video editing to be performed on suitable mobile processing devices. Such mobile device applications can provide an object based environment where distinct digital media units (e.g., still images, video clips, audio clips, etc.) can be imported and edited. These mobile device applications can also be operable to merge the imported digital media units based on modifications achieved in the editing environment.

Figure 1:
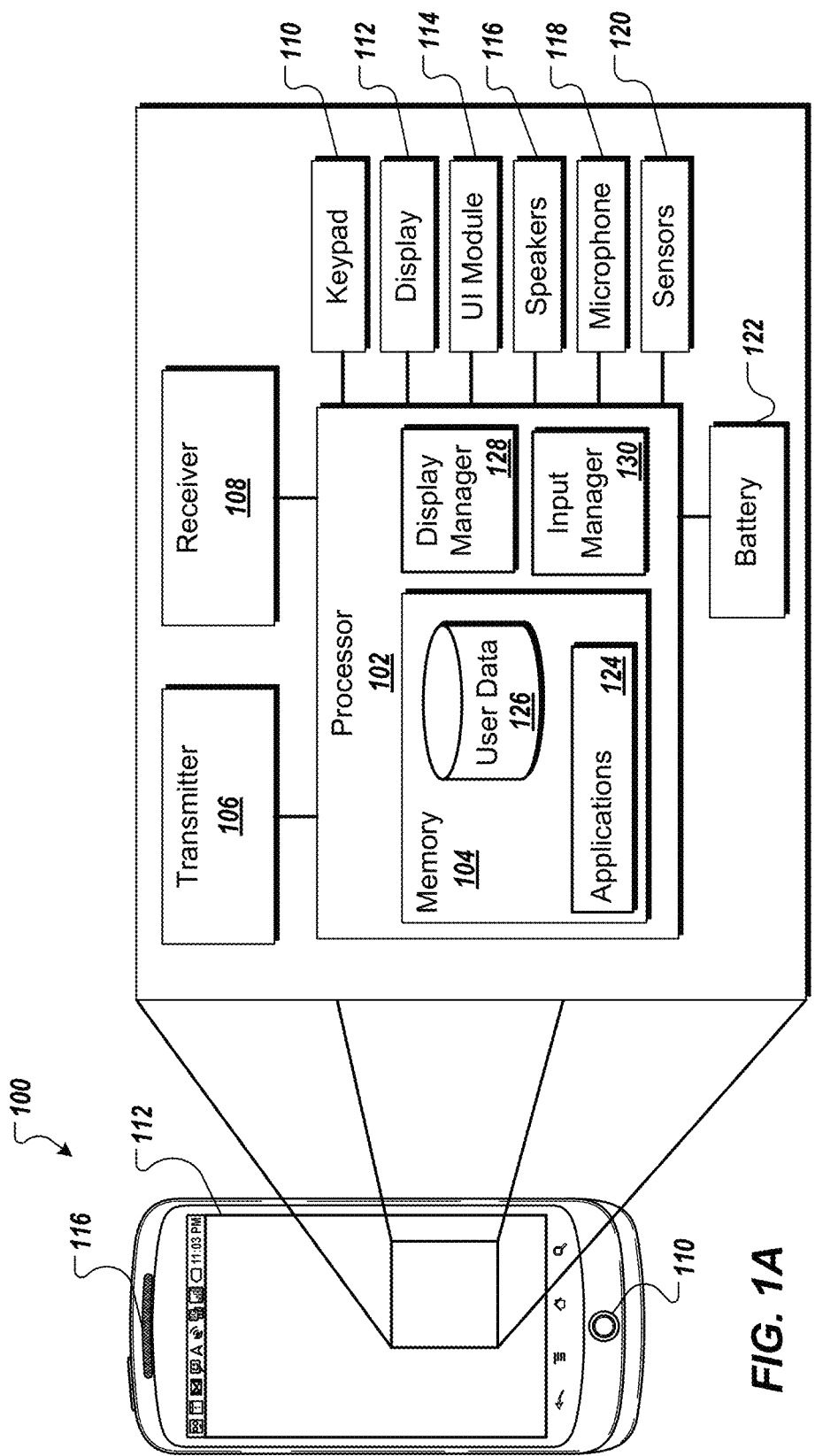
FIGS. 1A and 1B illustrate an example mobile processing device.

FIGS. 1A and 1B illustrate an example mobile processing device 100. In the depicted example, the mobile processing device 100 is provided as a smartphone. It is appreciated, however, implementations of the present disclosure can be realized using tablet computing devices, laptop computers, personal digital assistants (PDAs), mobile phones, or any one of many other known types of suitable mobile processing devices. As shown, the mobile processing device 100 includes one or more processors 102, memory 104 (e.g., computer readable media, read-only memory (ROM), random access memory (RAM), flash memory, a removable memory card (e.g., SD card), a hard disk, or any combination thereof), a transmitter 106, a receiver 108, a keypad 110 (e.g., a soft key), a display 112, a user-interface (UI) module 114 (e.g., a graphical user interface module for touchscreen devices), speakers 116, a microphone 118, sensors 120, and a battery 122. In some examples, the processor 102 can control each component of the mobile processing device 100 and can access memory 104 to run applications 124, and/or retrieve user data 126, which can be stored in the memory. The transmitter 106 and the receiver 108 transmit and receive signals (e.g., via one or more antennas) to other communication devices, base stations, computers, satellites (e.g., GPS satellites), and/or wireless access points. The keypad 110, the display 112, the speaker 116, and the microphone 118 are input/output devices for communicating with a user. The battery 120 provides power to appropriate components of the mobile processing device.

In some examples, the processor 102 can include a display manager 128 and an input manager 130. The display manager 128 can be operable to manage displayed on the display 112. In some implementations, an operating system running on the mobile device 102 can use the display manager 128 to arbitrate access to the display 112 for a number of applications 124 running on the mobile processing device 100. In some examples, a number of applications 124 can run concurrently on the mobile processing device 100, with each application being shown to the user in respective windows on the display 112. In such examples, the display manager 128 can control which portions of each application 124 are shown on the display 112. In some implementations, the display manager 128 can control the orientation (i.e., portrait orientation or landscape orientation) of the display 112. In some examples, the input manager 130 can be operable control the handling of data received from a user via one or more input devices of the mobile processing device 100. For example, the input manager 130 can determine which application 124 should be invoked as a result of user received input. In some implementations, the UI module 114 can coordinate with the input devices to a interpret user input. The interpreted input can be evaluated by the input manager 130 to determine which application 124 should be invoked.

Figure 2:
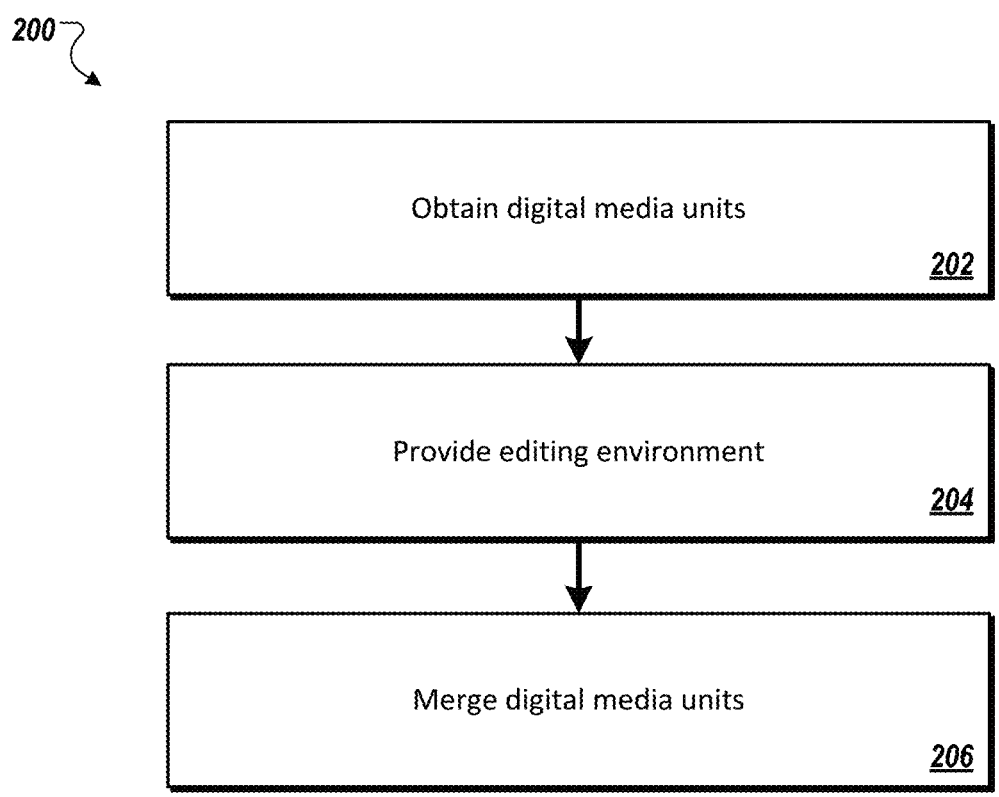
FIG. 2 depicts an exemplary process for editing digital media that can be performed by a mobile device application running on the mobile processing device of FIGS. 1A and 1B.

FIG. 2 depicts an example process 200 for editing digital media that can be performed by one or more mobile device applications executed on the mobile processing device 100. As shown, the process 200 includes obtaining a plurality of digital media units, at operation 202. Digital media units can be obtained by any one of several suitable procedures. In some examples, a digital media unit can include a digital video file, a digital image file and/or a digital audio file. In some implementations, digital media units can be obtained by accessing the user data 126 stored in memory 104. That is, digital video files, digital image files and/or a digital audio files can be stored in memory 104. In some examples, the mobile device application can enable a user to utilize the input components to select one or more digital media units stored in memory 104. In some examples, the mobile device application can copy the selected digital media units and store them in a suitable directory, or simply reference their location in memory 104. In some implementations, digital media units can also be obtained through a communications link (e.g., a wired or wireless communications link). For example, the mobile device application can enable a user to utilize the input components of mobile processing device 100 to select specific media units for downloading from a remote server or a computing system (e.g., a personal computer communicatively coupled to mobile processing device 100). The downloaded digital media units can be stored in memory 104. In some examples, digital media units can be created using and stored to the mobile processing device 100. For example, a digital camera can be used to capture digital images and/or digital video and store them as digital files on the mobile processing device 100. As another example, a microphone of the mobile processing device 100 can capture audio and store it in a digital audio file.

As shown, the process 200 also includes providing an editing environment, at operation 204. In some examples, the editing environment is an object based editing environment. In such examples, obtained digital media units can be represented as discrete objects arranged in the editing environment. In some implementations, a number of the discrete objects are arranged linearly by the mobile device application in a prescribed or random order. In some implementations, the mobile device application can enable users to rearrange the objects within the editing environment by utilizing the input components of the mobile processing device 100. In some examples, the digital media units can be arranged linearly, end-to-end, or in an overlapping manner by users. The mobile device application can also enable users to introduce additional objects to the editing environment. For example, objects representing additional digital media units can be introduced. In some implementations, objects in the editing environment can represent elements other than digital media units. For example, objects can represent effects or actions (such as transitions) to be implemented. Such objects can be imported manually by users, or automatically by the mobile device application.

As shown, the process 200 further includes merging the obtained plurality of digital media units to form a substantially continuous digital media unit, at operation 206. For example individual video clips, audio clips, and/or or still images can be merged (merged still images may be provided in the form of a slide show where each image is displayed for a predetermined duration). In some implementations, the plurality of digital media units are stitched together piece-by-piece according to the arranged configuration of representative objects in the editing environment. Further, in some examples, where an object in the editing environment represents a transition effect, the resulting "merge" of the pre-input media and the post-input media for that transition can be created based on the type of transition selected. The amount of overlap can be defined by the duration property for that transition object.

FIGS. 3A-3F depict the mobile processing device 100 running an example mobile device application (e.g., an application 124 stored in memory 104). As shown (for example in FIGS. 3A-3C), the mobile device application presents an editing environment 302 to users via the display 112 of the mobile processing device 100. A number of discrete virtual objects 304 (e.g., 304a and 304b) are disposed in a linear configuration within the editing environment 302. In this example, the objects 304 represent distinct digital media units available from memory 104 of the mobile processing device 100. In some implementations, the objects 304 are movable within editing environment 302. Therefore, as described above, the objects 304 can be rearranged in any prescribed order by a user. For example, a "drag-and-drop" technique can be executed by a user to rearrange the objects 304.

As shown, the mobile device application can provide a menu bar 306 including a number of selectable menu items. For example, selecting menu item 308 ("Projects") enables a user to access previously saved projects (i.e., instances of editing environment 302), or to create new projects. Various projects can include representations of the same, or different, digital media units. Selecting menu item 310 enables the user to adjust any one of several default settings for the project (e.g., screen orientation, video or sound quality, etc.). Selecting menu item 312 enables the user to view a help file. The help file can include various resources such as troubleshooting techniques, software patch or version notes, etc. Selecting menu item 314 ("Preview") enables the user to observe a preliminary version, or preview of a merged digital media unit (as described in greater detail below). In this example, the menu bar 306 also includes selectable toggle items 316a ("Video") and 316b ("Audio") for defining the type of digital media units that are displayed for editing.

In some implementations, the mobile device application can also provide an overview bar 318. As shown, the overview bar 318 includes a number of respective selectable tiles 320 corresponding to each object 304 in the editing environment 302. In some examples, selecting any one of tiles 320 simultaneously selects the corresponding object 304 for detailed display in the editing environment 302.

In some examples, users can add representations of additional digital media units (or other content) to the editing environment 302. Users can also modify digital media units that are already represented in the editing environment 302. For example, and with reference to FIG. 3B, when an existing object (e.g., object 304a) is selected and displayed, various selectable editing icons are displayed within the editing environment 302. In the depicted embodiment, the editing icons include an insert icon 322a, an insert icon 322b and an editing icon 324. Selecting either of insertion icons 322a, 322b enables the user to insert a digital media unit into editing environment 302 before or after the displayed object, respectively. In some examples, a menu is displayed in response to user selection of an insertion icon 322a, 322b, which menu includes object, transition and title options. The user can select object from the menu to insert select a digital media object for insertion. The user can select transition from the menu to select a transition for insertion. The user can select title from the menu to input a title for insertion.

Selecting editing item 324 enables the user to modify the digital media unit represented by the selected object. In some implementations, selecting editing item 324 allows the user to access one or more contextual editing options. For example, when a selected object is representative of a video clip, the mobile device application enables users to: add and/or remove frames, adjust a default playback speed, pan and/or zoom (e.g., via the Ken Burns effect or traditional cropping), etc. Similarly, when the selected object is representative of a still image, the mobile device application enables the user to: pan and/or zoom (e.g., via the Ken Burns effect or traditional cropping), add filters, etc.

Figure 3A:
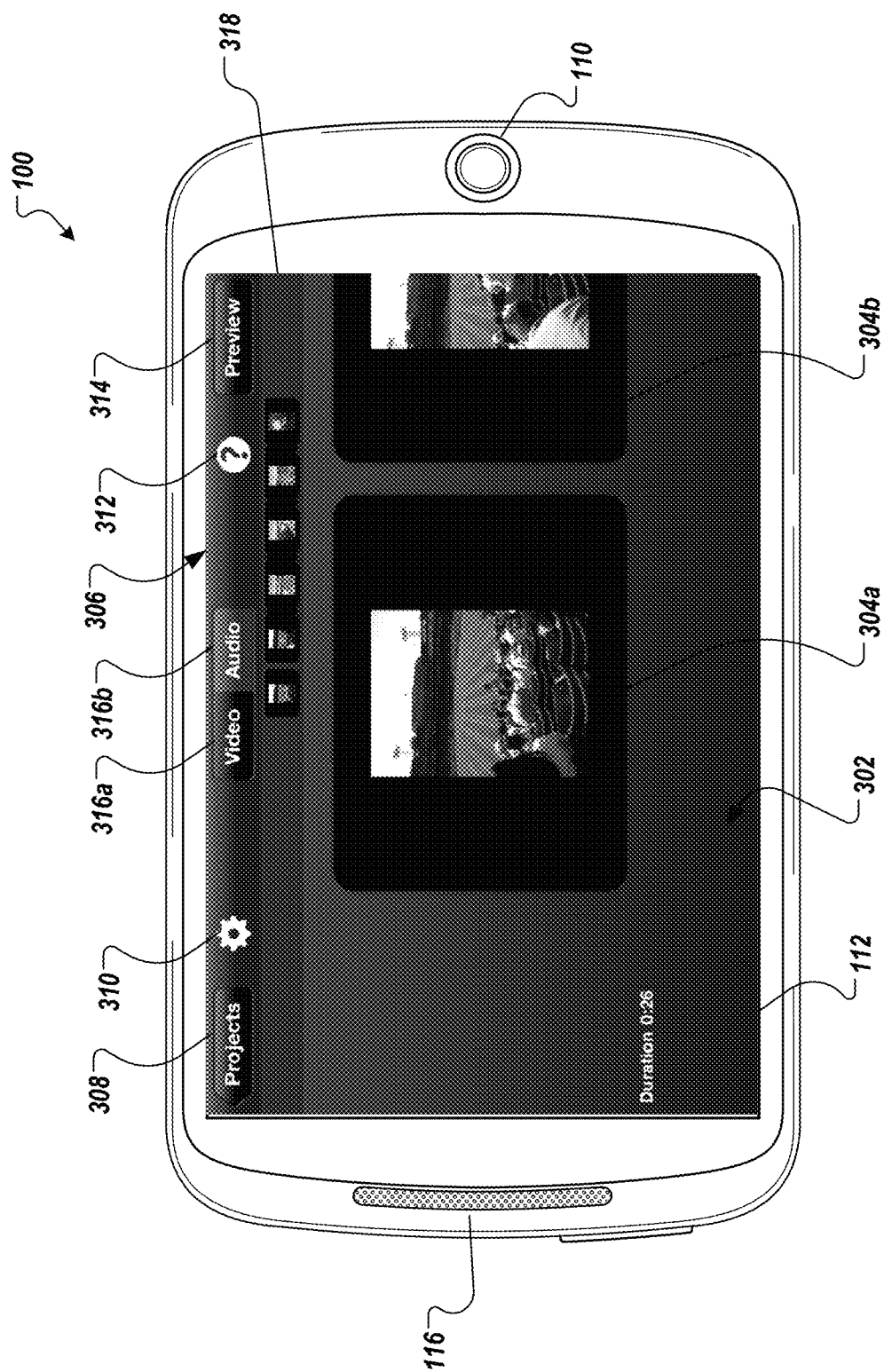
FIGS. 3A-3F depict the mobile processing device of FIGS. 1A and 1B running an example mobile device application.
Figure 3B:
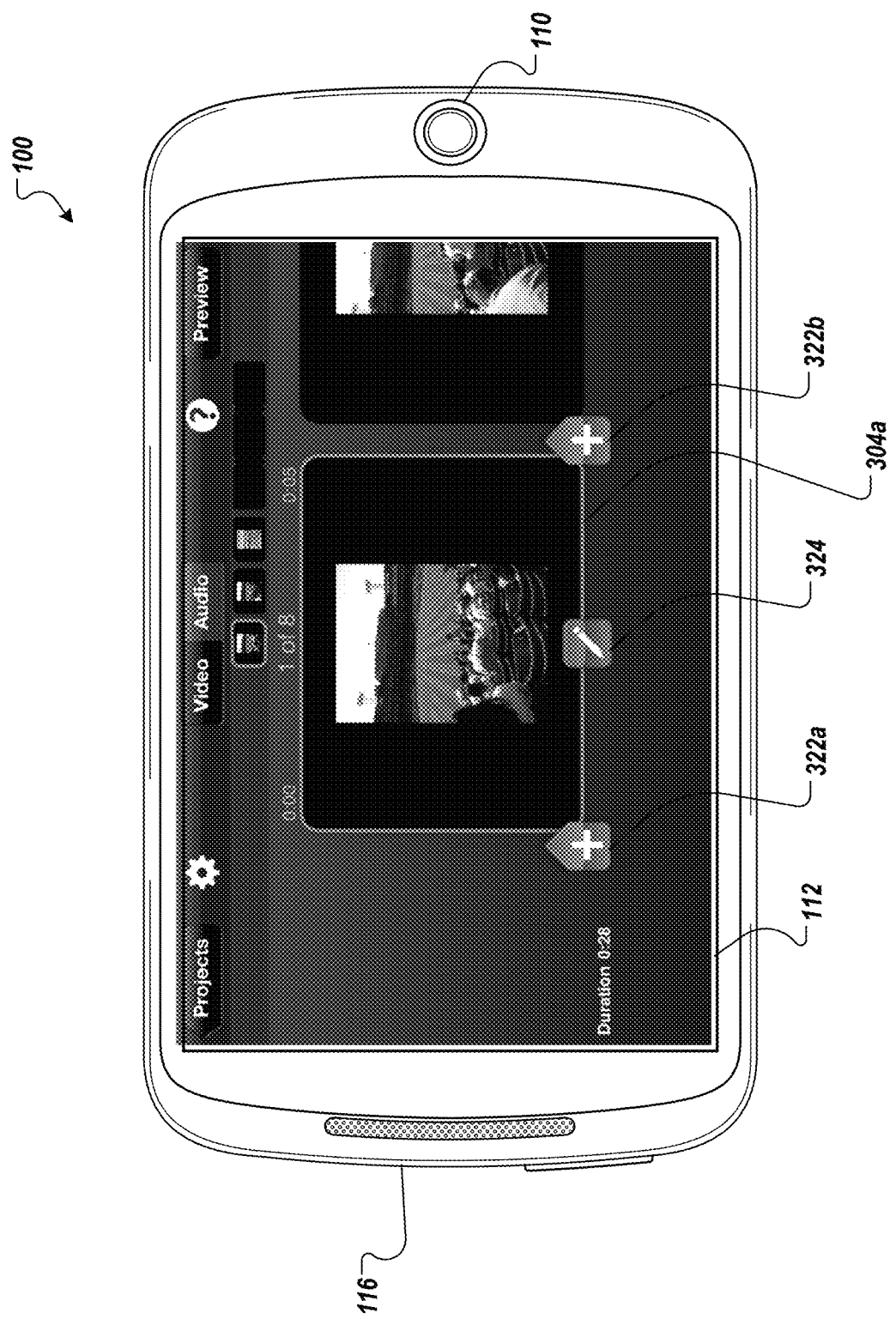
Figure 3C:
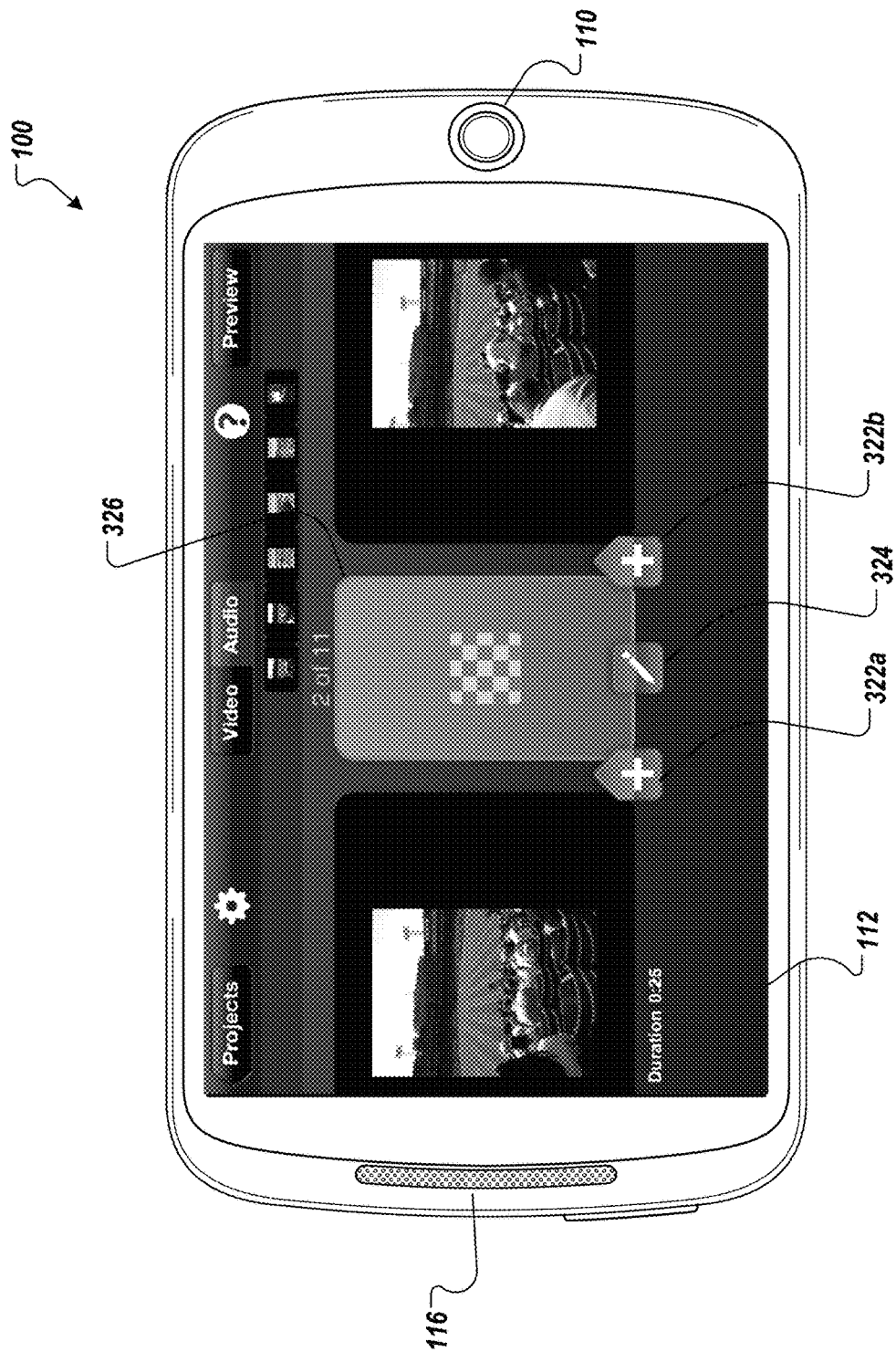

FIG. 3C shows a place holder for an additional object 326 to be imported into editing environment 302 and inserted between objects 304a and 304b. For example, the depiction of FIG. 3C is provided in response to user selection of the insert icon 322b of FIG. 3B, and making a selection from the displayed menu. In the depicted example, the object 326 can be representative of a transition effect to be inserted between the digital media units represented by the objects 304a and 304b. As noted above, the object 326 can be inserted manually by a user utilizing editing items 322a, 322b. In some examples, insertion of an object can be achieved automatically by the mobile device application. As shown, when the object 326 is selected, various selectable editing icons 322a, 322b, 324 are displayed within editing environment 302. Selecting either of editing items 322a, 322b enables the user to import additional content (e.g., additional representative objects) into editing environment 302.

Figure 3D:
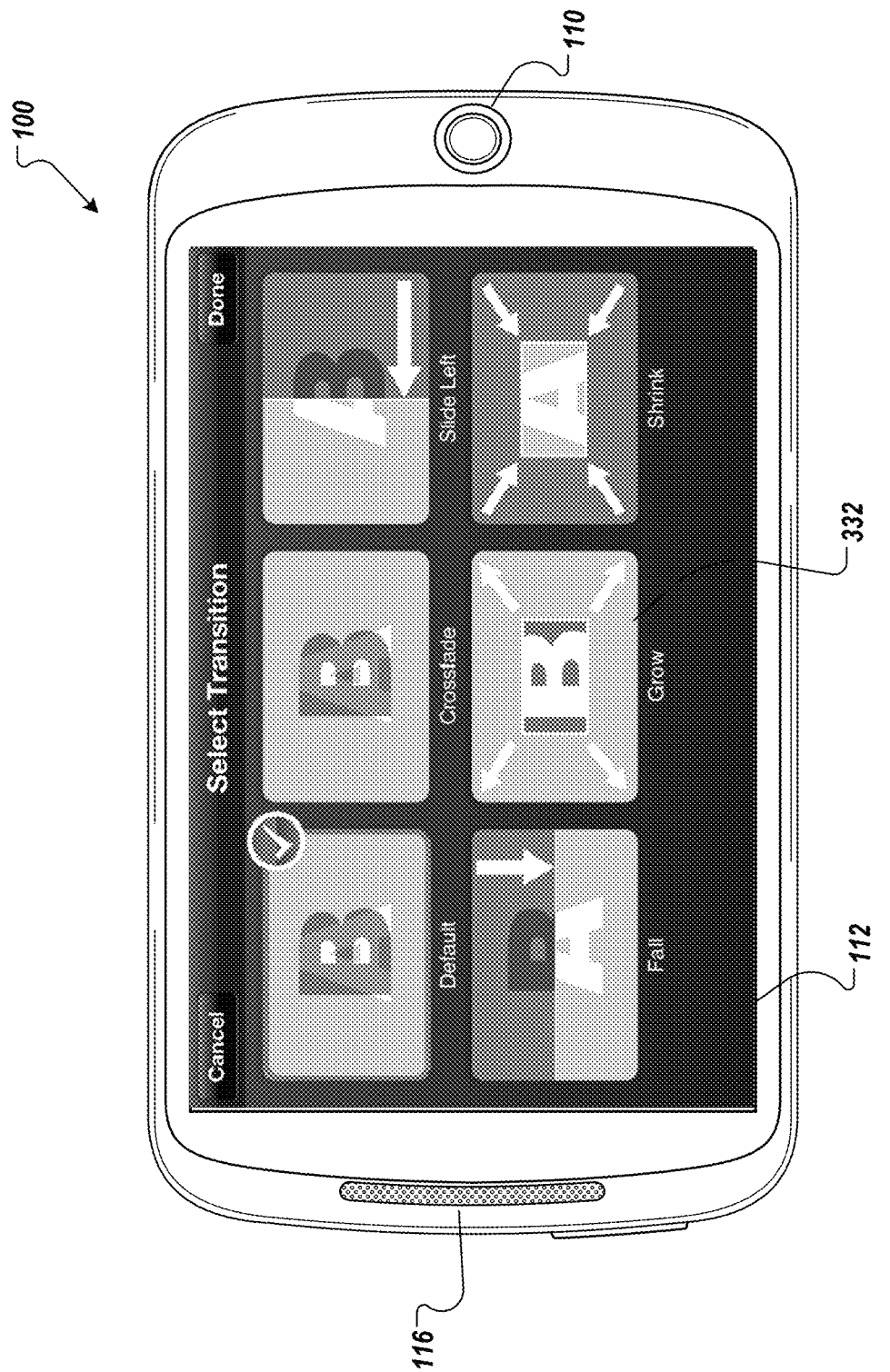

Selecting editing icon 324 enables the user to modify a default transition effect represented by object 326. FIG. 3D shows a menu of selectable items 332 for indicating a desired type of transition effect (e.g., "Default", "Crossfade", "Slide Left", "Fall", "Grow", "Shrink", etc.). The transition effect provides a visual transition between objects when the video is played. In some implementations, the transitions represented by selectable items 332 are organized in a library stored in memory 104 of mobile processing device 100. In some examples, additional transitions can be added to the library (for example, additional transitions can be downloaded from a remote server or a computing system) and represented in the menu by additional selectable items.

Figure 3E:
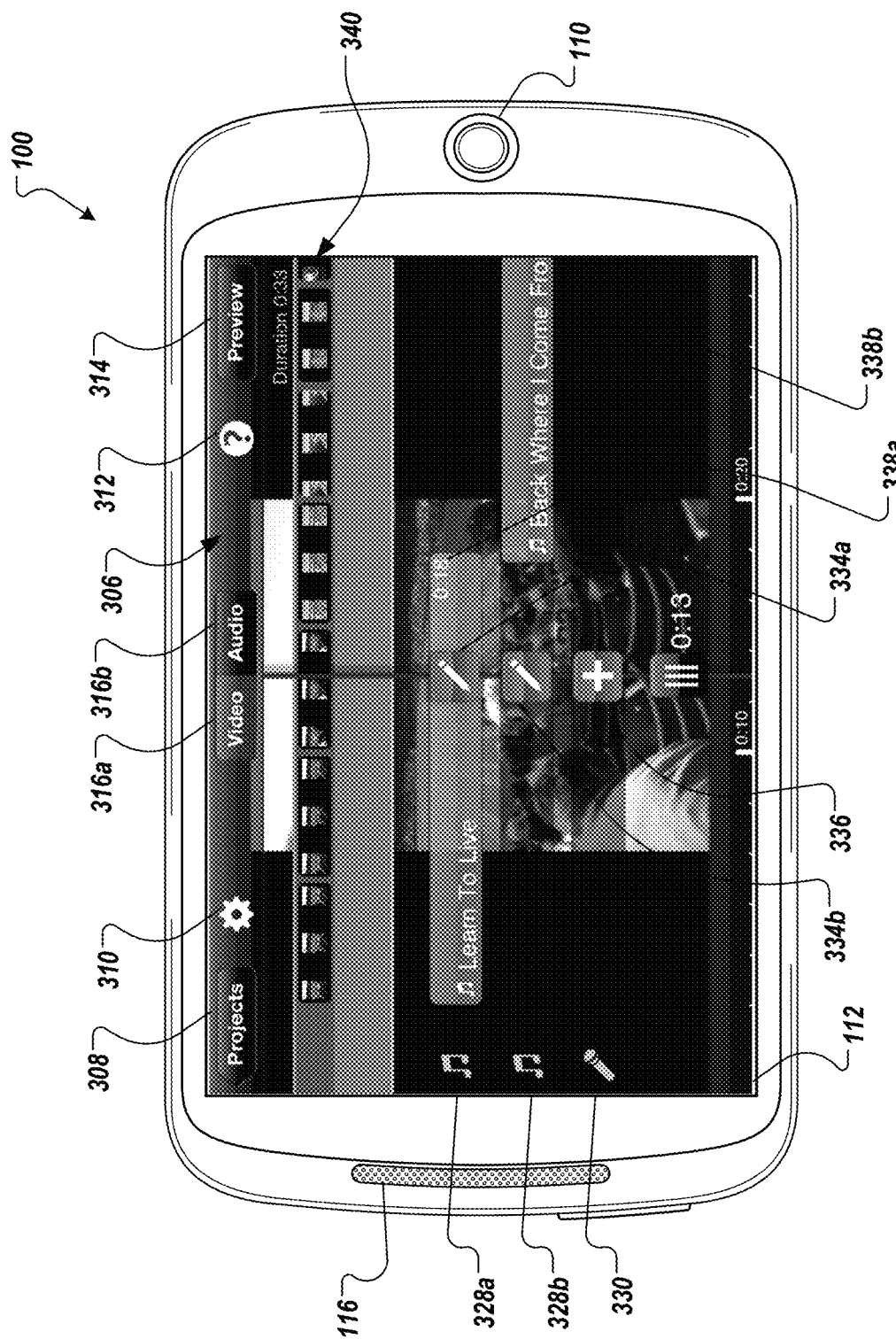

As described above, selectable toggle items 316a ("Video") and 316b ("Audio") can define the type of digital media units that are displayed for editing. FIG. 3E shows editing environment 302 when item 316b is selected. In the depicted example, audio slots 328a, 328b are provided and recording slot 330 is provided. The audio slots 328a, 328b can each be populated with an audio object. In the depicted example, the audio slots 328a, 328b are populated by audio objects represented by audio representations 338a, 338b, respectively, and the recording slot 330 is empty. In this example, audio representations 338a, 338b are provided in the form of linear segments aligned with a video timeline 340 (e.g., a frame-by-frame timeline). In some implementations, however, audio representations can be provided in the form of discrete objects that are movable within editing environment 302. In some example, when an audio slot is empty, an insert icon is displayed. In response to user selection of the insert icon, an audio object selection menu can be displayed, which the user can navigate to select an audio object for populating the audio slot.

Audio editing icons 334a, 334b, 336 are displayed. The audio editing icons 334a, 334b, 336 and audio representations 338a, 338b overlay frames of the objects that make up the video. Selecting either of editing icons 334a, 334b enables the user to edit an audio track represented by the audio representation 338a, 338b, respectively. In some examples, audio editing options include accelerating or decelerating the audio playback speed and/or setting start and end time points for the respective audio object relative to a timeline of the underlying video. Selecting icon 336 enables the user to record an audio file and import a representation of the recorded file into editing environment 302.

Figure 3F:
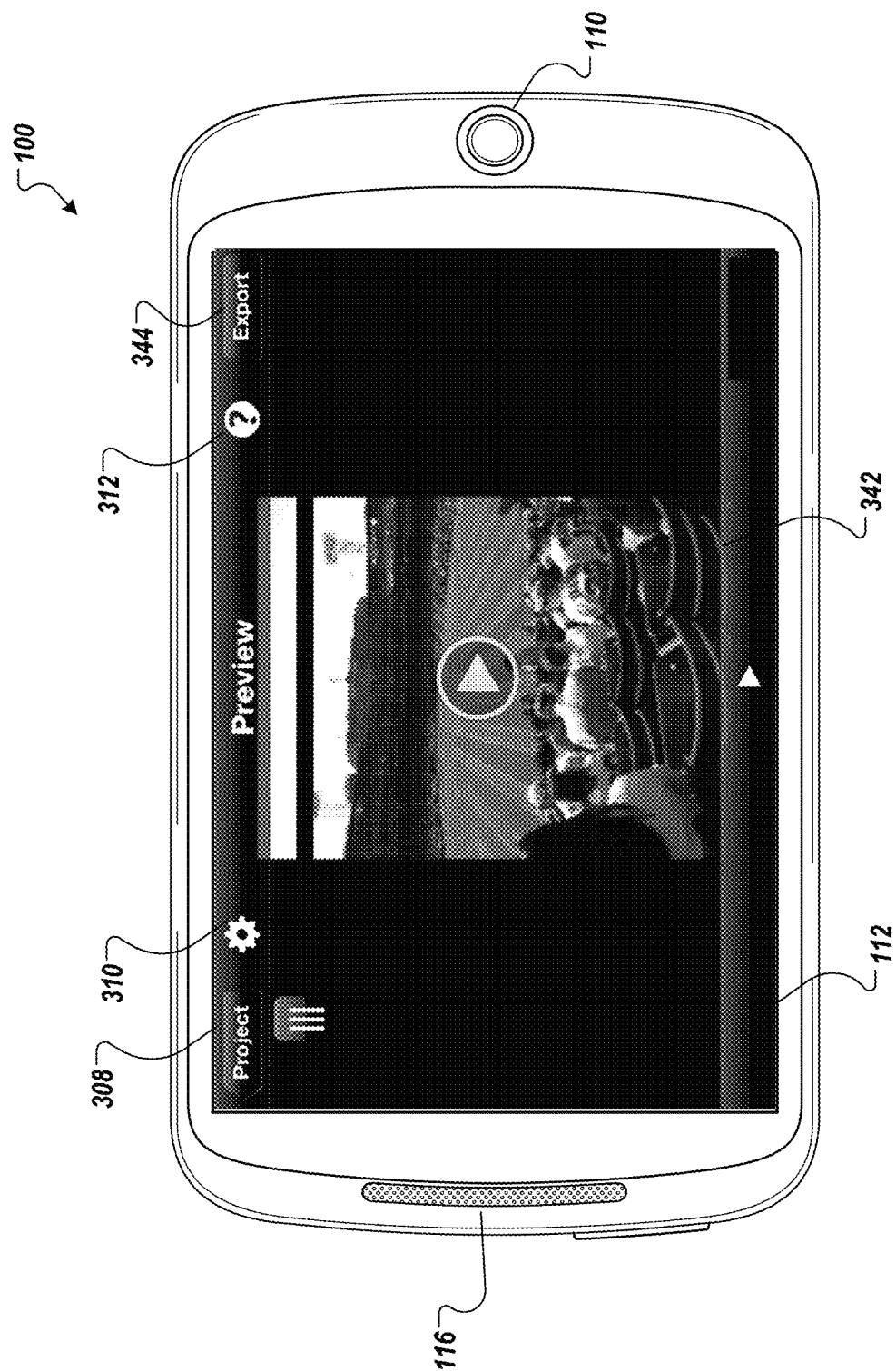

As described above, selecting the appropriate menu item enables the user to observe a preliminary version of the merged digital media unit. The merged digital media unit can include a combination of the digital media units and effects embodied by the representations imported into editing environment 302. In some implantations, a number of the digital media units and effects are combined in a chronological order prescribed by the arrangement of discrete objects in editing environment 302. FIG. 3F shows a preview screen presented to users via display 112 of mobile processing device 100. As shown, the preview screen includes a selectable media item 342. Selecting the media item can allow users to observe the merged digital media unit. Additionally, in this example, menu bar 306 includes selectable menu item 344 ("Export"), in addition to the various other menu items described above. Selecting menu item 344 can allow users to export the merged digital media unit to a specified location in memory 104 of mobile processing device 100.

Although described in the context of a mobile device application operating on a mobile processing device, it is appreciated that implementations of the present disclosure, and all of the functional operations provided herein, can be realized in any suitable type of digital electronic circuitry, or in computer software, firmware, or hardware, including the structures disclosed in this specification and their structural equivalents, or in combinations of one or more of them. Implementations of the present disclosure can also be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what can be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications can be made without departing from the spirit and scope of the disclosure. For example, various forms of the flows shown above can be used, with steps re-ordered, added, or removed. Accordingly, other implementations are within the scope of the following claims.

What is claimed is:

1. A computer-implemented method for providing a digital video using a mobile device, the method being executed by one or more processors and comprising:
    displaying, by the one or more processors, a first digital object representing a first digital video and a second digital object representing a second digital video in linear order within an editing environment provided on a mobile device;
    displaying, by the one or more processors, a first insert icon on a first side of the first digital object and a second insert icon on a second side of the first digital object, the first side of the first digital object being between the first digital object and the second digital object;
    in response to receiving first user input corresponding to the first insert icon, displaying, by the one or more processors, a first menu, the first menu including options for selection of a digital video, a title, and a transition for insertion;
    receiving, by the one or more processors, a second user input associated with the first menu, the second user input identifying the digital video, the title, or the transition selected to be inserted to the first side of the first digital object; and displaying, by the one or more processors, a third digital object representing the selected digital video, the selected title, or the selected transition within the editing environment, the third digital object located between the first digital object and the second digital object, the third digital object being different from the first insert icon.

2. The method of claim 1, wherein the first user interface insert icon indicates insertion of the selected digital video, the selected title, or the selected transition before the first digital object.

3. The method of claim 1, further comprising providing the digital video by merging the first digital video, the second digital video, and the selected digital video, the selected title, or the selected transition.

4. The method of claim 1, further comprising providing the digital video to a target, the digital video including a video stream obtained by merging the first digital video, the second digital video, and the selected digital video, the selected title, or the selected transition.

5. The method of claim 4, wherein the target comprises one of a display or a memory of the mobile device.

6. The method of claim 1, wherein the first menu comprises a plurality of selection elements, individual selection element corresponding to individual ones of the options for selection of the digital video, the title, and the transition.

7. The method of claim 6, wherein the second user input comprises a selection of one of the plurality of selection elements.

8. The method of claim 1, further comprising:
receiving third user input, the third user input corresponding to the second insert icon; and
in response to receiving the third user input, displaying a second menu.

9. The method of claim 1, further comprising displaying an overview timeline, the overview timeline comprising thumbnail representations of each of the first digital object, and the second digital object.

10. The method of claim 1, further comprising displaying a graphical representation of an audio object, the graphical representation being aligned with a video timeline of the digital video.

11. The method of claim 1, further comprising applying an editing effect to one or more of the first digital video, the second digital video, and the selected digital video, the selected title, or the selected transition, the editing effect comprising one or more of a playback speed adjustment, a pan effect, and a zoom effect.

12. The method of claim 1, further comprising:
displaying an edit icon between the first side and the second side of the first digital object; and
in response to receiving third user input corresponding to the edit icon, displaying a second menu, the second menu including options for modification of the first digital video represented by the first digital object.

13. A non-transitory computer-readable storage medium coupled to one or more processors and having instructions stored thereon which, when executed by the one or more processors, cause the one or more processors to perform operations for editing a digital video using a mobile device, the operations comprising:
displaying a first digital object representing a first digital video and a second digital object representing a second digital video in linear order within an editing environment provided on a mobile device;
displaying a first insert icon on a first side of the first digital object and a second insert icon on a second side of the first digital object, the first side of the first digital object being between the first digital object and the second digital object;
in response to receiving first user input corresponding to the first insert icon, displaying a first menu, the first menu including options for selection of a digital video, a title, and a transition for insertion;
receiving a second user input associated with the first menu, the second user input identifying the digital video, the title, or the transition selected to be inserted to the first side of the first digital object; and
displaying a third digital object representing the selected digital video, the selected title, or the selected transition within the editing environment, the third digital object located between the first digital object and the second digital object, the third digital object being different from the first insert icon.

14. The non-transitory computer-readable storage medium of claim 13, wherein the operations further comprise:
displaying an edit icon between the first side and the second side of the first digital object; and
in response to receiving third user input corresponding to the edit icon, displaying a second menu, the second menu including options for modification of the first digital video represented by the first digital object.

15. The non-transitory computer-readable storage medium of claim 13, wherein the operations further comprise:
providing the digital video by merging the first digital video, the second digital video, and the selected digital video, the selected title, or the selected transition.

16. The non-transitory computer-readable storage medium of claim 13, wherein the first menu comprises a plurality of selection elements, individual selection element corresponding to individual ones of the options for selection of the digital video, the title, and the transition.

17. A system, comprising:
a computing device; and
a computer-readable storage device coupled to the computing device and having instructions stored thereon which, when executed by the computing device, cause the computing device to perform operations for editing a digital video using a mobile device, the operations comprising:
displaying a first digital object representing a first digital video and a second digital object representing a second digital video in linear order within an editing environment provided on the mobile device;
displaying a first insert icon on a first side of the first digital object and a second insert icon on a second side of the first digital object, the first side of the first digital object being between the first digital object and the second digital object;
in response to receiving first user input corresponding to the first insert icon, displaying a first menu, the first menu including options for selection of a digital video, a title, and a transition for insertion;
receiving a second user input associated with the first menu, the second user input identifying the digital video, the title, or the transition selected to be inserted to the first side of the first digital object; and
displaying a third digital object representing the selected digital video, the selected title, or the selected transition within the editing environment, the third digital object located between the first digital object and the second digital object, the third digital object being different from the first insert icon.

18. The system of claim 17, wherein the operations further comprise:
displaying an edit icon between the first side and the second side of the first digital object; and
in response to receiving third user input corresponding to the edit icon, displaying a second menu, the second menu including options for modification of the first digital video represented by the first digital object.

19. The system of claim 17, wherein the operations further comprise:
providing the digital video by merging the first digital video, the second digital video, and the selected digital video, the selected title, or the selected transition.

20. The system of claim 17, wherein the first menu comprises a plurality of selection elements, individual selection element corresponding to individual ones of the options for selection of the digital video, the title, and the transition.

* * * * *